US008548321B2

(12) United States Patent
Iizuka et al.

(10) Patent No.: US 8,548,321 B2
(45) Date of Patent: Oct. 1, 2013

(54) OPTICAL TRANSMISSION APPARATUS

(75) Inventors: Hiroshi Iizuka, Kawasaki (JP); Takeshi Sakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 786 days.

(21) Appl. No.: 12/385,072

(22) Filed: Mar. 30, 2009

(65) Prior Publication Data
US 2009/0190925 A1 Jul. 30, 2009

Related U.S. Application Data

(63) Continuation of application No. PCT/JP2006/321063, filed on Oct. 23, 2006.

(51) Int. Cl.
*H04B 10/00* (2013.01)

(52) U.S. Cl.
USPC .............................. 398/30; 398/181

(58) Field of Classification Search
USPC .................................... 398/30, 181
See application file for complete search history.

(56) References Cited

U.S. PATENT DOCUMENTS

| | | | |
|---|---|---|---|
| 5,159,481 A * | 10/1992 | Maeda | 398/202 |
| 5,287,168 A * | 2/1994 | Poucher et al. | 356/436 |
| 5,440,418 A | 8/1995 | Ishimura et al. | |
| 5,966,237 A | 10/1999 | Sugaya et al. | |
| 5,995,274 A | 11/1999 | Sugaya et al. | |
| 6,025,947 A | 2/2000 | Sugaya et al. | |
| 6,144,485 A | 11/2000 | Sugaya et al. | |
| 6,157,481 A | 12/2000 | Sugaya et al. | |
| 6,198,572 B1 | 3/2001 | Sugaya et al. | |
| 6,271,962 B1 * | 8/2001 | Choi | 359/337.11 |
| 6,292,289 B1 * | 9/2001 | Sugaya et al. | 359/337 |
| 6,377,395 B2 | 4/2002 | Sugaya et al. | |
| 6,411,407 B1 * | 6/2002 | Maxham | 398/173 |
| 6,646,791 B2 | 11/2003 | Sugaya et al. | |
| 6,865,016 B2 | 3/2005 | Sugaya et al. | |
| 7,227,681 B2 | 6/2007 | Sugaya et al. | |
| 2002/0027703 A1 | 3/2002 | Kinoshita et al. | |
| 2002/0041431 A1 * | 4/2002 | Ohshima et al. | 359/334 |
| 2002/0110318 A1 * | 8/2002 | Wu et al. | 385/24 |

(Continued)

FOREIGN PATENT DOCUMENTS

| | | |
|---|---|---|
| EP | 1349308 | 10/2003 |
| EP | 1349309 | 10/2003 |
| EP | 1367753 | 12/2003 |
| GB | 2268852 | 1/1994 |
| GB | 2268852 | 2/1994 |
| JP | 6-268604 | 9/1994 |
| JP | 11-312848 | 11/1999 |
| JP | 2003-163642 | 6/2003 |

OTHER PUBLICATIONS

Patent Abstracts of Japan, Publication No. 2000-196169, published Jul. 14, 2000.

(Continued)

*Primary Examiner* — Danny Leung
(74) *Attorney, Agent, or Firm* — Staas & Halsey LLP

(57) ABSTRACT

In an optical transmission apparatus, a unit includes a first connection section, a second connection section, a branching section, a first detection section, and a second detection section. The first connection section connects to a first component. The second connection section connects to a second component. The branching section is disposed at a preceding stage of the second connection section and outputs signal light to the first component through the first connection section. The first detection section determines whether the first component receives the signal light output from the branching section. The second detection section is disposed at a subsequent stage of the second connection section and detects the signal light.

2 Claims, 11 Drawing Sheets

(56) References Cited

U.S. PATENT DOCUMENTS

| | | | |
|---|---|---|---|
| 2003/0099432 A1 | 5/2003 | Furuki et al. | |
| 2003/0206744 A1* | 11/2003 | Doh et al. | 398/209 |
| 2004/0208505 A1 | 10/2004 | Kinoshita et al. | |
| 2004/0208506 A1 | 10/2004 | Kinoshita et al. | |
| 2004/0208561 A1 | 10/2004 | Kinoshita et al. | |
| 2005/0185957 A1* | 8/2005 | Ohtani et al. | 398/33 |

OTHER PUBLICATIONS

Patent Abstracts of Japan, Publication No. 2003-124891, published Apr. 25, 2003.

Patent Abstracts of Japan, Publication No. 6-268604, published Sep. 22, 1994.

Patent Abstracts of Japan, Publication No. 2005-244305, published Sep. 8, 2005.

Patent Abstracts of Japan, Publication No. 2003-338794, published Nov. 28, 2003.

Patent Abstracts of Japan, Publication No. 2003-318840, published Nov. 7, 2003.

Patent Abstracts of Japan, Publication No. 06-037717, published Feb. 10, 1994.

Patent Abstracts of Japan Publication No. 2003-163642, published Jun. 6, 2003.

Patent Abstracts of Japan Publication No. 11-312848, published Nov. 9, 1999.

Japanese Office Action, Interrogation, issued Aug. 14, 2012 in corresponding Japanese Patent Application No. 2008-540817.

* cited by examiner

| No | STATE | PD-SIG or PD-OSC | PD-AMP | PD-OSC-R | PD-OSC-U | DESCRIPTION |
|---|---|---|---|---|---|---|
| 1 | USUAL OPERATION STATE (NON-ZERO-WAVE OPERATION STATE) | O(PD-SIG) | O | O | O | USUAL OPERATION STATE |
| 2 | | ×(PD-SIG) | × | × | × | WDM LOS (LOW INPUT, INCREASED LOSS IN TRANSMISSION LINE, OR OTHERS) |
| 3 | | O(PD-SIG) | × | × | O | UNUSUAL CONNECTION WITH DCF |
| 4 | | O(PD-SIG) | O | O | × | OSC LOS (LOW OSC LIGHT LEVEL DUE TO UNUSUAL CONNECTION WITH OSC UNIT) |
| 5 | | O(PD-SIG) | × | O | O | DCF LOS (UNUSUAL INPUT TO PreAMPMd) |
| 6 | ZERO-WAVE OPERATION STATE | O(PD-OSC) | × | × | O | UNUSUAL CONNECTION WITH DCF |
| 7 | | O(PD-OSC) | × | O | × | UNUSUAL CONNECTION WITH OSC UNIT |
| 8 | | O(PD-OSC) | × | O | O | USUAL CONNECTIONS WITH DCF AND OSC UNIT |

FIG. 3

| No | STATE | | PD-SIG or PD-OSC | PD-AMP | PD-OSC-R | PD-OSC-U | PD-OSC-Core | DESCRIPTION |
|---|---|---|---|---|---|---|---|---|
| 1 | USUAL OPERATION STATE (NON-ZERO-WAVE OPERATION STATE) | | O(PD-SIG) | O | O | O | O | USUAL OPERATION STATE |
| 2 | | | ×(PD-SIG) | × | × | × | × | WDM LOS (LOW INPUT, INCREASED LOSS IN TRANSMISSION LINE, OR OTHERS) |
| 3 | | | O(PD-SIG) | × | × | O | × | UNUSUAL CONNECTION WITH DCF |
| 4 | | | O(PD-SIG) | O | O | × | O | OSC LOS (LOW OSC LIGHT LEVEL DUE TO UNUSUAL CONNECTION WITH OSC UNIT) |
| 5 | | | O(PD-SIG) | × | O | O | O | DCF LOS (UNUSUAL INPUT TO PreAMPMd) |
| 6 | ZERO-WAVE OPERATION STATE | | O(PD-OSC) | O | O | O | × | UNUSUAL INPUT TO CORE UNIT |
| 7 | | | O(PD-OSC) | × | × | O | × | UNUSUAL CONNECTION WITH DCF |
| 8 | | | O(PD-OSC) | × | O | O | × | UNUSUAL INPUT TO CORE UNIT |
| 9 | | | O(PD-OSC) | × | O | × | O | UNUSUAL CONNECTION WITH OSC UNIT |
| 10 | | | O(PD-OSC) | × | O | O | O | USUAL CONNECTIONS WITH DCF AND OSC UNIT |

FIG. 6

| No | STATE | PD-SIG or PD-OSC | PD-AMP | PD-OSC-U | DESCRIPTION |
|---|---|---|---|---|---|
| 1 | USUAL OPERATION STATE (NON-ZERO-WAVE OPERATION STATE) | O(PD-SIG) | O | O | USUAL OPERATION STATE |
| 2 | | ×(PD-SIG) | × | × | WDM LOS (LOW INPUT, INCREASED LOSS IN TRANSMISSION LINE, OR OTHERS) |
| 3 | | O(PD-SIG) | × | × | UNUSUAL CONNECTION WITH DCF OR OSC UNIT (CANNOT BE IDENTIFIED) |
| 4 | | O(PD-SIG) | O | × | OSC LOS (LOW LIGHT LEVEL DUE TO UNUSUAL CONNECTION WITH OSC UNIT OR OTHERS) |
| 5 | | O(PD-SIG) | × | O | WDM LOS OR DCF LOS (UNUSUAL INPUT TO PreAMPMd) |
| 6 | ZERO-WAVE OPERATION STATE | O(PD-OSC) | × | O | NO DISCONNECTION OF DCF BECAUSE OF ZERO-WAVE OPERATION STATE |
| 7 | | O(PD-OSC) | × | × | UNUSUAL CONNECTION WITH DCF OR OSC UNIT (CANNOT BE IDENTIFIED) |

FIG. 11

OPTICAL TRANSMISSION APPARATUS

This application is a continuing application, filed under 35 U.S.C Section 111(a), of International Application PCT/JP2006/321063, filed on Oct. 23, 2006.

FIELD

The embodiments discussed herein are related to optical transmission apparatuses.

BACKGROUND

Currently, wavelength division multiplexing (WDM) has been widely used, which multiplexes and sends signal light having different wavelengths to increase the transmission capacity. In optical ring networks, optical transmission apparatuses having an optical add-drop multiplex (OADM) function for adding or dropping a signal with a wavelength.

In such optical transmission apparatuses, even when the level of light per wavelength is as low as several dBm, if signal light is multiplexed, a very high output power of 20 dBm, for example, is obtained, which needs safety precautions. For example, some optical transmission apparatuses fall in CDRH (Center for Devices and Radiological Health) Class IIIb, a safety precaution standard. Therefore, optical transmission apparatuses are generally provided with an automatic power shut down (APSD) function as a safety precaution. When an unusual connection of optical fiber is detected, the laser diode (LD) of the optical amplifier is shut down to forcibly stop outputting the signal light.

FIG. 9 illustrates an example optical ring network. As illustrated in FIG. 9, optical transmission apparatuses 101 to 106 form a ring network with an upstream link 111 and a downstream link 112. In the ring network, the optical transmission apparatus 101 adds signal light, and the optical transmission apparatus 104 drops the signal light. The optical transmission apparatus 101 outputs the identical signal light to the upstream link 111 and the downstream link 112, and the optical transmission apparatus 104 drops the signal light from the upstream link 111.

It is assumed here, for example, that the optical fiber was disconnected in the upstream link 111 between the optical transmission apparatus 102 and the optical transmission apparatus 103. The optical transmission apparatus 103 detects the disconnection of signal light and forcibly shuts down the output of the signal light from the optical transmission apparatus 102 (APSD function). The optical transmission apparatus 104 switches a port for dropping signal light from the upstream link 111 to the downstream link 112. With this switching, even though the optical fiber was disconnected in the upstream link 111 between the optical transmission apparatus 102 and the optical transmission apparatus 103, the transmission of the signal light is maintained.

In such an optical communication network, a state where no operating wavelength light (main signal) is used (only optical supervisory channel (OSC) light is used, hereinafter called a zero-wave operation state) occurs when a protection function (such as port switching described above) is executed, when the number of wavelengths is specified in response to a request in an optical transmission apparatus having the OADM function, or when an optical network is started up. Even in such a zero-wave operation state, the connection of optical fiber, including a dispersion compensation fiber (DCF), needs to be monitored.

The detection of the state of an optical transmission apparatus will be described below at a usual operation state (where operating wavelength light and OSC light are used) and a zero-wave operation state. First, the structure of the optical transmission apparatus will be described.

FIG. 10 is a block diagram of an optical transmission apparatus. FIG. 10 illustrates the optical transmission apparatus 102 illustrated in FIG. 9. The other optical transmission apparatuses have the same structure.

The optical transmission apparatus 102 includes optical amplifier units 120 and 140, OSC units 151 and 152, and core (switch) units 153 and 154. For example, each unit consists of one printed circuit board and is connected to other units through connectors.

The optical amplifier unit 120 amplifies signal light received from the optical transmission apparatus 101 and outputs it to the core unit 153. The core unit 153 drops the signal light or adds signal light, and outputs the signal light to the optical amplifier unit 140 (although the optical transmission apparatus 102 does not drop the signal light or add signal light in the case of FIG. 9). The optical amplifier unit 140 amplifies the signal light output from the core unit 153 and outputs it to the optical transmission apparatus 103.

The optical amplifier unit 140 amplifies signal light received from the optical transmission apparatus 103 and outputs it to the core unit 154. The core unit 154 drops the signal light or adds signal light, and outputs the signal light to the optical amplifier unit 120 (although the optical transmission apparatus 102 does not drop the signal light or add signal light in the case of FIG. 9). The optical amplifier unit 120 amplifies the signal light output from the core unit 154 and outputs it to the optical transmission apparatus 101.

The OSC unit 151 monitors the optical network for an alarm or the like according to OSC light included in the signal light received from the optical transmission apparatus 101 and also monitors the optical transmission apparatus 102 itself for an alarm or the like. The OSC unit 151 outputs collected alarm information about the optical network and the optical transmission apparatus 102 itself to the optical transmission apparatus 101 through the optical amplifier unit 120.

The OSC unit 152 monitors the optical network for an alarm or the like according to OSC light included in the signal light received from the optical transmission apparatus 103 and also monitors the optical transmission apparatus 102 itself for an alarm or the like. The OSC unit 152 outputs collected alarm information about the optical network and the optical transmission apparatus 102 itself to the optical transmission apparatus 103 through the optical amplifier unit 140.

In the optical amplifier unit 120, a coupler 121 branches the signal light received from the optical transmission apparatus 101 and outputs it to a coupler 122 and a variable optical attenuator (VOA) 125.

The coupler 122 separates the signal light output from the coupler 121 into operating wavelength light and OSC light and outputs the operating wavelength light to a PD-SIG 123 and the OSC light to a PD-OSC 124. The PD-SIG 123 detects the level of the operating wavelength light, and the PD-OSC 124 detects the level of the OSC light.

The VOA 125 controls the attenuation of the signal light according to the level of light detected by a PD-VOA 126. A DCF 128 is connected between connectors 127a and 127b of the optical amplifier unit 120 to perform dispersion compensation of the signal light output from the PD-VOA 126.

A coupler 129 separates the signal light output from the DCF 128 into operating wavelength light and OSC light and outputs the operating wavelength light to a pre-amplifier module (PreAMPMd) 130 and the OSC light to the OSC unit 151. The OSC unit 151 is connected between connectors 132a and 132b of the optical amplifier unit 120.

In the OSC unit 151, a PD-OSC-U 133 detects the level of the OSC light input to the OSC unit 151. The optical transmission apparatus 102 uses whether the level of light is detected by the PD-OSC-U 133 to determine an unusual connection (such as a disconnected connector) of the DCF 128 and the OSC unit 151.

In the optical amplifier unit 120, a coupler 135 multiplexes operating wavelength light output from a post-amplifier module (PostAMPMd) 134 and the OSC light output from the OSC unit 151. The signal light obtained by this multiplexing is output to the optical transmission apparatus 101.

The PreAMPMd 130 amplifies the operating wavelength light output from the coupler 129 and outputs it to the core unit 153. The PreAMPMd 130 includes a PD-AMP 131 for detecting the level of the operating wavelength light at an input stage.

In the optical amplifier unit 140, a PostAMPMd 141 amplifies the operating wavelength light output from the core unit 153. A coupler 142 multiplexes OSC light output from the OSC unit 152 and the operating wavelength light output from the PostAMPMd 141. The signal light obtained by this multiplexing is output to the optical transmission apparatus 103. A coupler 143 separates the signal light received from the optical transmission apparatus 103 into operating wavelength light and OSC light, and outputs the OSC light to the OSC unit 152. A PreAMPMd 144 amplifies the operating wavelength light output from the coupler 143 and outputs it to the core unit 154.

Each of the PD-SIG 123, the PD-OSC 124, the PD-VOA 126, the PD-AMP 131, and the PD-OSC-U 133 is, for example, a tap photodiode (PD) or the combination of a PD and a coupler.

FIG. 11 illustrates the states of the optical transmission apparatus 102. FIG. 11 also illustrates whether each PD (each of the PD-SIG 123, the PD-OSC 124, the PD-AMP 131, and the PD-OSC-U 133) described with reference to FIG. 10 detects the level of light. In the FIG. 11, the symbol ○ indicates that each PD detects the level of light and the symbol X indicates that the PD detects no level of light.

As indicated by No. 1, when each of the PD-SIG 123, the PD-AMP 131, and the PD-OSC-U 133 detects the level of light, the optical transmission apparatus 102 determines that it is in a usual operation state.

As indicated by No. 2, when each of the PD-SIG 123, the PD-AMP 131, and the PD-OSC-U 133 detects no level of light, the optical transmission apparatus 102 determines that it has an increased loss in a transmission line or has a low input level of the signal light (WDM-LOS).

As indicated by No. 3, when the PD-SIG 123 detects the level of light, but neither the PD-AMP 131 nor the PD-OSC-U 133 detects the level of light, the optical transmission apparatus 102 determines that it has an unusual connection with the DCF 128 or the OSC unit 151. In this case, however, the optical transmission apparatus 102 is unable to identify an unusual connection with the OSC unit 151 because it is impossible to determine whether an unusual connection with the DCF 128 or an unusual connection with the OSC unit 151 causes the PD-OSC-U 133 to detect no level of light.

As indicated by No. 4, when only the PD-OSC-U 133 detects no level of light, the optical transmission apparatus 102 determines that it has an unusual connection with the OSC unit 151 (OSC-LOS).

As indicated by No. 5, when only the PD-AMP 131 detects no level of light, the optical transmission apparatus 102 determines that it is in the WDM-LOS state or has a low input level at the PreAMPMd 130 (DCF-LOS).

As indicated by No. 6, when only the PD-OSC 124 and the PD-OSC-U 133 detect the levels of light, the optical transmission apparatus 102 determines that the DCF 128 has no unusual connection. Since the operating wavelength light is not used, that is, the zero-wave operation state occurs, in No. 6 and No. 7, the state of the optical transmission apparatus 102 is determined by whether the PD-OSC 124 detects the level of light. Since the operating wavelength light is not used, the PD-AMP 131 detects no level of light.

As indicated by No. 7, when the PD-OSC 124 detects the level of light, but neither the PD-AMP 131 nor the PD-SC-U 133 detects the level of light, the optical transmission apparatus 102 determines that the DCF 128 or the OSC unit 151 has an unusual connection. This is because it is impossible to determine whether an unusual connection with the DCF 128 or an unusual connection with the OSC unit 151 causes the PD-OSC-U 133 to detect no level of light.

The optical transmission apparatus 102 branches the OSC light at a subsequent stage of the DCF 128, and the PD-OSC-U 133 monitors the level of the OSC light to determine an unusual connection with the OSC unit 151. Therefore, as indicated in No. 3 and No. 7, when the PD-SIG 123 detects the level of light (No. 3) or the PD-OSC 124 detects the level of light (No. 7) but the PD-OSC-U 133 detects no level of light, the optical transmission apparatus 102 is unable to determine whether an unusual connection occurred with the DCF 128 or the OSC unit 151.

An optical amplification apparatus in which a DCF is connected between two amplifiers has been-proposed (for example, see Japanese Laid-open Patent Publication No. 2000-196169). An optical amplification apparatus that separates light into main signal light and a monitor control signal and detects the light level of the monitor control signal has also been proposed (for example, see Japanese Laid-open Patent Publication No. 2003-124891).

As described above, in conventional optical transmission apparatuses, unusual connections of components with a unit is unable to be identified.

SUMMARY

According to an aspect of the embodiments, an optical transmission apparatus for transmitting wavelength division multiplexed signal light includes a unit which includes: a first connection section connected to a first component; a second connection section connected to a second component; a branching section disposed at a preceding stage of the second connection section, to output the signal light to the first component through the first connection section; a first detection section which determines whether the first component receives the signal light output from the branching section; and a second detection section disposed at a subsequent stage of the second connection section, to detect the signal light.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates the states of the optical transmission apparatus;

FIG. 6 illustrates the states of the optical transmission apparatus;

FIG. 11 illustrates the state of the conventional optical transmission apparatus.

DESCRIPTION OF EMBODIMENT(S)

Embodiments of the present invention will be described below in detail with reference to the drawings, wherein like reference numbers refer to like elements throughout.

Figure 1:
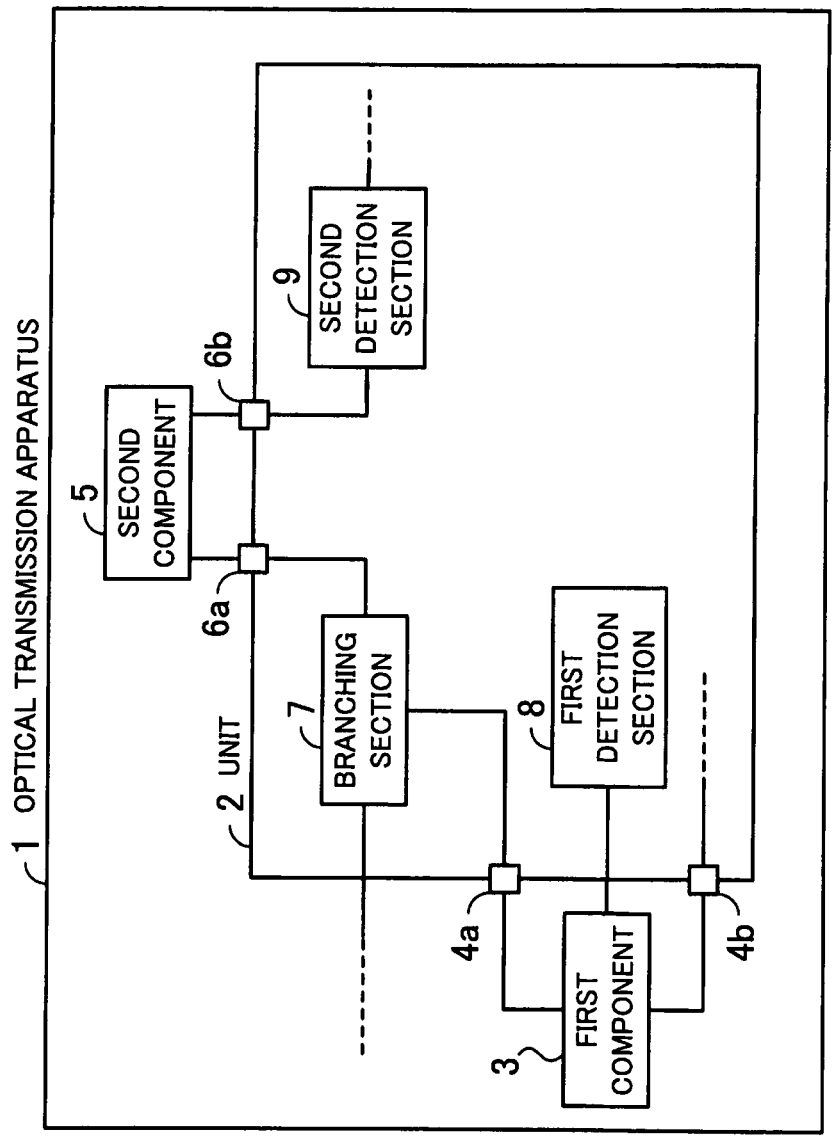
FIG. 1 illustrates an outline of an optical transmission apparatus.

FIG. 1 illustrates an outline of an optical transmission apparatus 1. The optical transmission apparatus 1 includes a unit 2. The unit 2 includes first connection sections 4a and 4b, second connection sections 6a and 6b, a branching section 7, a first detection section 8, and a second detection section 9.

The first connection sections 4a and 4b are connected to a first component 3. The second connection sections 6a and 6b are connected to a second component 5. The first component 3 is, for example, an optical supervisory channel (OSC) unit for monitoring monitoring-control signal light. The second component 5 is, for example, a dispersion compensation fiber (DCF).

The branching section 7 is provided at a preceding stage of the second connection sections 6a and 6b and branches signal light received from another optical transmission apparatus to output it to the first component 3 and the second component 5.

The first detection section 8 determines whether the first component 3 receives the signal light output from the branching section 7.

The second detection section 9 is provided at a subsequent stage of the second connection sections 6a and 6b and detects the signal light.

As described above, in the optical transmission apparatus 1, the signal light is output to the first component 3 at a preceding stage of the second component 5; the first detection section 8 determines whether the first component 3 receives the signal light; and the second detection section 9 detects the signal light at a subsequent stage of the second component 5.

Therefore, the first detection section 8 can detect an unusual connection of the first component 3, and the second detection section 9 can detect an unusual connection of the second component 5. Consequently, an unusual connection with the first component 3 and an unusual connection with the second component 5 can be identified.

An optical transmission apparatus according to a first embodiment will be described next in detail with reference to the drawings.

Figure 2:
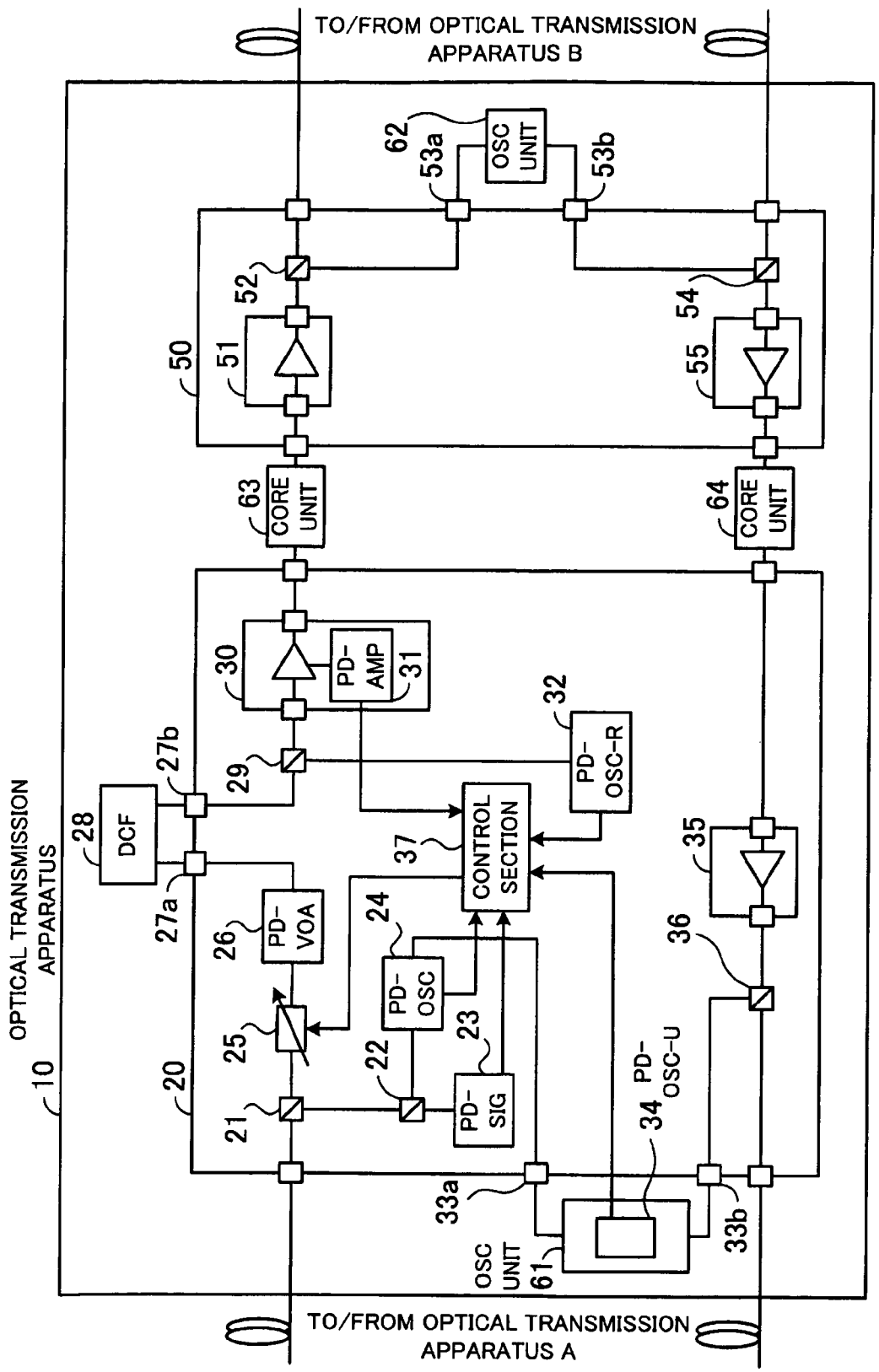
FIG. 2 is a block diagram of an optical transmission apparatus according to a first embodiment.

FIG. 2 is a block diagram of an optical transmission apparatus 10 according to the first embodiment. As illustrated in FIG. 2, the optical transmission apparatus 10 includes optical amplifier units 20 and 50, OSC units 61 and 62, and core units 63 and 64. For example, each unit consists of one printed circuit board and is connected to other units through connectors. The optical transmission apparatus 10 is, for example, a part of an optical ring network and connected to an optical transmission apparatus A at the upstream side and to an optical transmission apparatus B at the downstream side.

The optical amplifier unit 20 amplifies signal light received from the optical transmission apparatus A and outputs it to the core unit 63. The core unit 63 drops the signal light or adds signal light, and outputs the signal light to the optical amplifier unit 50. The optical amplifier unit 50 amplifies the signal light output from the core unit 63 and outputs it to the optical transmission apparatus B.

The optical amplifier unit 50 amplifies signal light received from the optical transmission apparatus B and outputs it to the core unit 64. The core unit 64 drops the signal light or adds signal light, and outputs the signal light to the optical amplifier unit 20. The optical amplifier unit 20 amplifies the signal light output from the core unit 64 and outputs it to the optical transmission apparatus A.

The OSC unit 61 monitors the optical network for an alarm or the like according to OSC light included in the signal light received from the optical transmission apparatus A and also monitors the optical transmission apparatus 10 itself for an alarm or the like. The OSC unit 61 outputs collected alarm information about the optical network and the optical transmission apparatus 10 itself to the optical transmission apparatus A through the optical amplifier unit 20.

The OSC unit 62 monitors the optical network for an alarm or the like according to OSC light included in the signal light received from the optical transmission apparatus B and also monitors the optical transmission apparatus 10 itself for an alarm or the like. The OSC unit 62 outputs collected alarm information about the optical network and the optical transmission apparatus 10 itself to the optical transmission apparatus B through the optical amplifier unit 50.

The optical amplifier unit 20 includes couplers 21, 22, 29, 36, a PD-SIG 23, a PD-OSC 24, a VOA 25, a PD-VOA 26, connectors 27a, 27b, 33a, 33b, a PreAMPMd 30, a PD-OSC-R 32, a PD-OSC-U 34, and a PostAMPMd 35. Each of the PD-SIG 23, the PD-OSC 24, the PD-VOA 26, the PD-AMP 31, the PD-OSC-R 32, and the PD-OSC-U 34 is, for example, a tap photodiode (PD) or the combination of a PD and a coupler.

The coupler 21 branches the signal light received from the optical transmission apparatus A and outputs it to the coupler 22 and the VOA 25.

The coupler 22 separates the signal light output from the coupler 21 into operating wavelength light and OSC light and outputs the operating wavelength light to the PD-SIG 23 and the OSC light to the PD-OSC 24. The PD-SIG 23 detects the level of the operating wavelength light output from the coupler 22, and the PD-OSC 24 detects the level of the OSC light output from the coupler 22.

The VOA 25 controls the attenuation of the signal light according to the level of light detected by the PD-VOA 26. The PD-VOA 26 detects the level of the signal light output from the VOA 25.

A DCF 28 is connected between the connectors 27a and 27b of the optical amplifier unit 20 to perform dispersion compensation of the signal light output from the PD-VOA 26.

The coupler 29 separates the signal light output from the DCF 28 into operating wavelength light and OSC light and outputs the operating wavelength light to the PreAMPMd 30 and the OSC light to the PD-OSC-R 32. The PD-OSC-R 32 detects the level of the OSC light output from the coupler 29.

The PreAMPMd 30 includes an optical amplifier and a PD-AMP 31 for detecting the level of light at an input stage of the optical amplifier. The PreAMPMd 30 amplifies the operating wavelength light output from the coupler 29 and outputs it to the core unit 63.

The OSC unit 61 is connected between the connectors 33a and 33b of the optical amplifier unit 20. The OSC light output from the PD-OSC 24 is input to the OSC unit 61 through the connector 33a.

The PD-OSC-U 34 detects the level of the OSC light input to the OSC unit 61. The OSC light is output from the OSC unit 61 to the coupler 36.

The PostAMPMd 35 amplifies the operating wavelength light output from the core unit 64. The coupler 36 multiplexes the operating wavelength light output from the PostAMPMd 35 and the OSC light output from the OSC unit 61. The signal light obtained by this multiplexing is output to the optical transmission apparatus A.

A control section 37 detects an unusual connection of the DCF 28, an unusual connection of the OSC unit 61, and an alarm such as WDM-LOS according to whether the light levels are detected by the PD-SIG 23, the PD-OSC 24, the PD-AMP 31, the PD-OSC-R 32, and the PD-OSC-U 34. When the control section 37 detects an unusual connection of the DCF 28, the control section 37 controls the VOA 25 such that the signal light is not output from the connection between the optical amplifier unit 20 and the DCF 28. When the control section 37 detects an unusual connection of the DCF 28 and an unusual input to the PreAMPMd 30, the control section performs an automatic power shut down (APSD) operation.

The optical amplifier unit 50 includes a PostAMPMd 51, couplers 52 and 54, connectors 53a and 53b, and a PreAMPMd 55.

The PostAMPMd 51 amplifies the operating wavelength light output from the core unit 63. The coupler 52 multiplexes OSC light output from the OSC unit 62 and the operating wavelength light output from the PostAMPMd 51. The signal light obtained by this multiplexing is output to the optical transmission apparatus B.

The coupler 54 separates the signal light received from the optical transmission apparatus B into operating wavelength light and OSC light, and outputs the operating wavelength light to the PreAMPMd 55 and the OSC light to the connector 53b. The OSC unit 62 is connected between the connectors 53a and 53b of the optical amplifier unit 50. The PreAMPMd 55 amplifies the operating wavelength light output from the coupler 54 and outputs it to the core unit 64.

In the optical transmission apparatus 10 illustrated in FIG. 2, the signal light received from the optical transmission apparatus A is branched by the coupler 21 at a preceding stage of the DCF 28 and then further separated by the coupler 22 into the operating wavelength light and the OSC light. The OSC light separated by the coupler 22 is output to the OSC unit 61, and the PD-OSC-U 34 detects the level of the OSC light input to the OSC unit 61. In this way, the OSC light which does not pass through the DCF 28 is used to detect an unusual connection of the OSC unit 61.

The signal light received from the optical transmission apparatus A passes through the DCF 28 and the OSC light is separated therefrom by the coupler 29 at a subsequent stage of the DCF 28. The PD-OSC-R 32, disposed at a subsequent stage of the DCF 28, determines whether the level of the OSC light is detected, to detect an unusual connection of the DCF 28.

In this way, an unusual connection of the OSC unit 61 is detected at a preceding stage of the DCF 28, and an unusual connection of the DCF 28 is detected at a subsequent stage of the DCF 28. Therefore, an unusual connection of the OSC unit 61 and an unusual connection of the DCF 28 can be identified.

FIG. 3 illustrates the states of the optical transmission apparatus 10. FIG. 3 illustrates whether each of the PD-SIG 23, the PD-OSC 24, the PD-AMP 31, the PD-OSC-R 32, and the PD-OSC-U 34 described with reference to FIG. 2 detects the level of light. In FIG. 3, the symbol ○ indicates that the level of light is detected by each PD and the symbol X indicates that the level of light is not detected by the PD.

As indicated by No. 1, when each of the PD-SIG 23, the PD-AMP 31, the PD-OSC-R 32 and the PD-OSC-U 34 detects the level of light, the optical transmission apparatus 10 determines that it is in a usual operation state.

As indicated by No. 2, when each of the PD-SIG 23, the PD-AMP 31, the PD-OSC-R 32, and the PD-OSC-U 34 detects no level of light, the optical transmission apparatus 10 determines that it has a WDM-LOS state.

As indicated by No. 3, when the PD-SIG 23 and the PD-OSC-U 34 detect the levels of light, but neither the PD-AMP 31 nor the PD-OSC-R 32 detects the level of light, the optical transmission apparatus 10 determines that it has an unusual connection with the DCF 28. Since the PD-OSC-U 34 detects the level of light, it can be determined that the OSC unit 61 does not have an unusual connection. Because the PD-OSC-R 32 detects no level of light, it can be determined that the DCF 28 has an unusual connection. An unusual connection of the DCF 28 can be identified.

As indicated by No. 4, when only the PD-OSC-U 34 detects no level of light, the optical transmission apparatus 10 determines that it has an unusual connection with the OSC unit 61.

As indicated by No. 5, when only the PD-AMP 31 detects no level of light, the optical transmission apparatus 10 determines that it has a DCF-LOS state. Because the PD-OSC-R 32 detects the level of light, it can be determined that the DCF 28 has no unusual connection. It can be determined that the PreAMPMd 30 has an unusual input.

Since the operating wavelength light is not used, that is, the zero-wave operation state occurs, in No. 6 to No. 8, the state of the optical transmission apparatus 10 is determined by whether the PD-OSC 24 detects the level of light. Since the operating wavelength light is not used, the PD-AMP 31 detects no level of light.

As indicated by No. 6, when only the PD-OSC 24 and the PD-OSC-U 34 detect the levels of light, the optical transmission apparatus 10 determines that the DCF 28 has an unusual connection. Because the PD-OSC-U 34 detects the level of light, it can be determined that the OSC unit 61 has no unusual connection. An unusual connection of the DCF 28 can be identified.

As indicated by No. 7, when only the PD-OSC 24 and the PD-OSC-R 32 detect the levels of light, the optical transmission apparatus 10 determines that the OSC unit 61 has an unusual connection. Because the PD-OSC-R 32 detects the level of light but the PD-OSC-U 34 detects no level of light, it can be determined that the OSC unit 61 has an unusual connection.

Since it is determined that the OSC unit 61 has an unusual connection, the path of the operating waveform light has no problem, and the PreAMPMd 30 is in a usual state (an automatic gain control (AGC) state or an AGC shut down state) and can be used. Therefore, the optical transmission apparatus 10 illustrated in FIG. 2 can identify an unusual connection of the DCF 28 and an unusual connection of the OSC unit 61 and does not need to perform an APSD operation when the OSC unit 61 has an unusual connection, whereas, conventionally, because an unusual connection of the DCF 28 and an unusual connection of the OSC unit 61 is unable to be identified, the optical transmission apparatus A at the upstream side needs to be started up when an APSD operation is performed.

As indicated by No. 8, when only the PD-AMP 31 detects no level of light, the optical transmission apparatus 10 determines that neither the DCF 28 nor the OSC unit 61 has an unusual connection. This is because the PD-OSC-R 32 and the PD-OSC-U 34 detect the level of light.

As described above, an unusual connection of the OSC unit 61 is detected at a preceding stage of the DCF 28, and an unusual connection of the DCF 28 is detected at a subsequent stage of the DCF 28. Therefore, an unusual connection of the OSC unit 61 and an unusual connection of the DCF 28 can be identified.

In No. 3 and No. 6, described above, since the optical transmission apparatus 10 performs an APSD operation due to the occurrence of an unusual connection of the DCF 28, the PostAMPMd of the optical transmission apparatus A at the upstream side is shut down. During the process of the APSD operation, however, if signal light is input to the optical transmission apparatus 10, high power light may be output from the connection between the optical amplifier unit 20 and the DCF 28.

To prevent this high power light from being output from the connection between the optical amplifier unit 20 and the DCF 28, the control section 37 increases the attenuation in the VOA 25 when an unusual connection of the DCF 28 is detected.

Usually, the attenuation target in the VOA 25 is determined by taking into account the minimum detection level which the PD-OSC-R 32 and the PD-AMP 31 can detect and the maximum loss at the DCF 28. When an unusual connection of the DCF 28 occurs, the PD-VOA 26 detects the level of signal light (OSC light in a zero-wave operation state) and the VOA 25 is controlled such that the detected level equals to a target level. More specifically, the VOA 25 is controlled such that the level of light detected by the PD-VOA 26 is equal to the sum of the minimum detection level of the PD-OSC-R 32 and the maximum loss at the DCF 28.

By controlling the VOA 25 in this manner, high power signal light can be prevented from being output from the connection between the optical amplifier unit 20 and the DCF 28 when the DCF 28 has an unusual connection, irrespective of whether the operating wavelength light is used or not.

Figure 4:
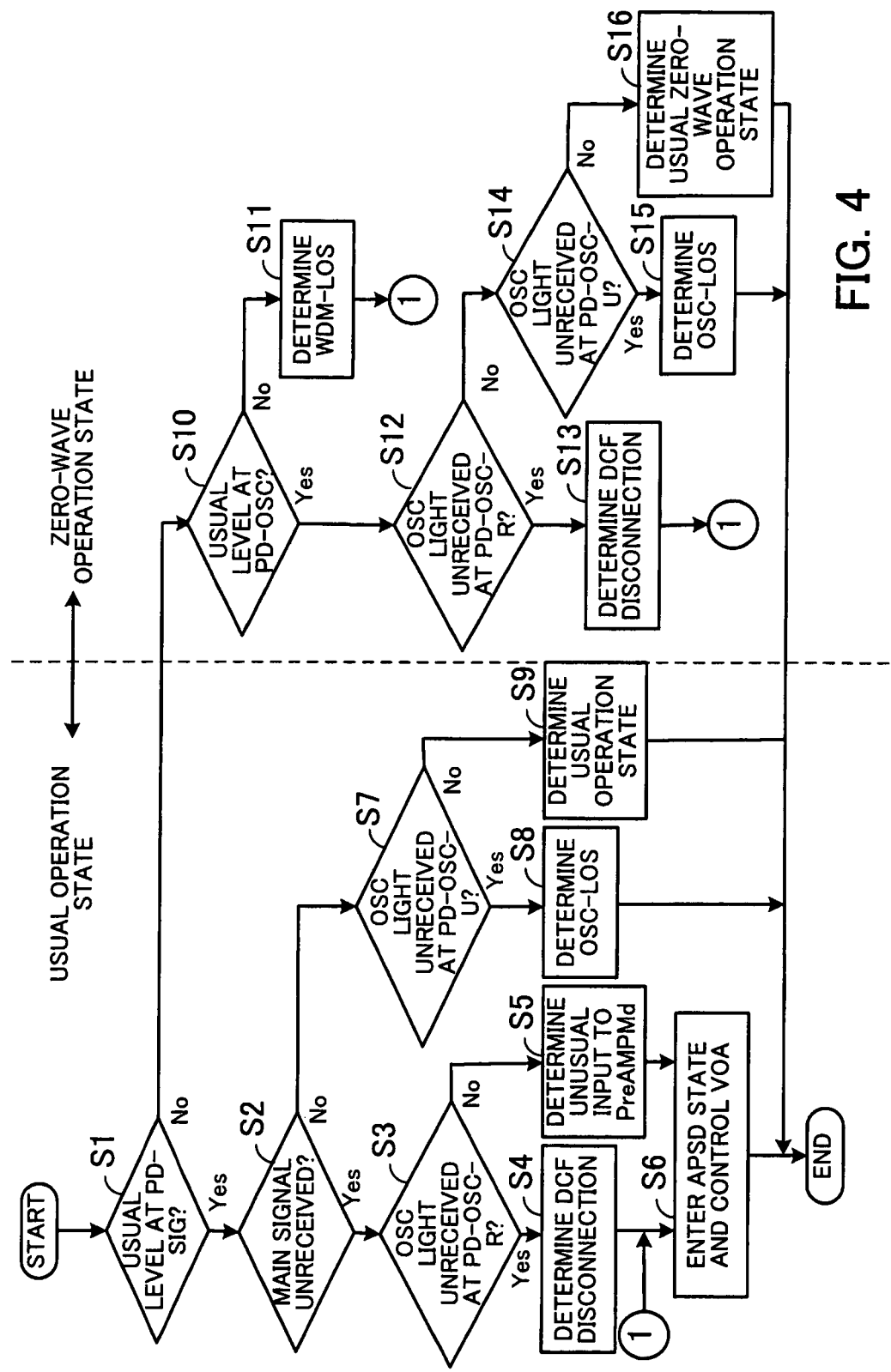
FIG. 4 is a flowchart of the operation of the optical transmission apparatus.

FIG. 4 is a flowchart of the operation of the optical transmission apparatus 10.

Step S1: The optical transmission apparatus 10 determines whether the PD-SIG 23 detects a usual level of light. In other words, the optical transmission apparatus 10 determines whether it is in the usual operation state. When the usual level of light is detected, the procedure proceeds to step S2. If the usual level of light is not detected, the procedure proceeds to step S10. Whether the optical transmission apparatus 10 is in the usual operation state or in the zero-wave operation state can be determined by receiving information about the number of wavelengths used, from the optical transmission apparatus A disposed at the upstream side.

Step S2: The optical transmission apparatus 10 determines according to the level of light detected by the PD-AMP 31 whether the operating wavelength light (main signal) is unreceived. If it is determined that the level of light detected by the PD-AMP 31 is lower than a predetermined level, in other words, that the main signal is unreceived, the procedure proceeds to step S3. When it is determined that the main signal is received, the procedure proceeds to step S7.

Step S3: The optical transmission apparatus 10 determines whether the OSC light is unreceived at the PD-OSC-R 32. In other words, the optical transmission apparatus 10 determines whether the PD-OSC-R 32 detects a predetermined level of OSC light. If the OSC light is unreceived, the procedure proceeds to step S4. When the OSC light is received, the procedure proceeds to step S5.

Step S4: The optical transmission apparatus 10 determines an unusual connection of the DCF 28. In other words, when the PD-AMP 31 detects no level of the main signal light and the PD-OSC-R 32 detects no level of the OSC light, the optical transmission apparatus 10 determines an unusual connection of the DCF 28.

Step S5: The optical transmission apparatus 10 determines an unusual input to the PreAMPMd 30. In other words, when the PD-AMP 31 detects no level of the main signal light but the PD-OSC-R 32 detects the level of the OSC light, the optical transmission apparatus 10 determines an unusual input to the PreAMPMd 30.

Step S6: The optical transmission apparatus 10 enters an APSD state. For example, control is made such that signal light is not output to the optical transmission apparatus A disposed at the upstream side. When the optical transmission apparatus 10 enters an APSD state, high power signal light may be output from the connection between the DCF 28 and the optical amplifier unit 20. Therefore, the optical transmission apparatus 10 controls the VOA 25 to increase the attenuation.

Step S7: The optical transmission apparatus 10 determines whether the OSC light is unreceived at the PD-OSC-U 34. In other words, the optical transmission apparatus 10 determines whether the OSC unit 61 has an unusual connection. If the optical transmission apparatus 10 determines that the OSC light is unreceived, the procedure proceeds to step S8. When the OSC light is received, the procedure proceeds to step S9.

Step S8: The optical transmission apparatus 10 determines OSC-LOS.

Step S9: The optical transmission apparatus 10 determines that it is in the usual operation state.

Step S10: The optical transmission apparatus 10 determines whether the PD-OSC 24 detects a usual level of light. When the usual level of light is detected, the procedure proceeds to step S12. If the usual level of light is not detected, the procedure proceeds to step S11.

Step S11: The optical transmission apparatus 10 determines WDM-LOS and the procedure proceeds to step S6.

Step S12: The optical transmission apparatus 10 determines whether the PD-OSC-R 32 detects the level of light. If the PD-OSC-R 32 detects no level of light, the procedure proceeds to step S13. When the PD-OSC-R 32 detects the level of light, the procedure proceeds to step S14.

Step S13: The optical transmission apparatus 10 determines an unusual connection of the DCF 28.

Step S14: The optical transmission apparatus 10 determines whether the PD-OSC-U 34 detects the level of light. In other words, the optical transmission apparatus 10 determines whether the OSC unit 61 has an unusual connection. When the optical transmission apparatus 10 determines that the PD-OSC-U 34 detects the level of light, the procedure proceeds to step S16. If the PD-OSC-R 34 detects no level of light, the procedure proceeds to step S15.

Step S15: The optical transmission apparatus 10 determines OSC-LOS.

Step S16: The optical transmission apparatus 10 determines that it is in the usual zero-wave operation state.

When the optical transmission apparatus 10 determines in step S7 or S14 that the OSC unit 61 has an unusual connection, the optical transmission apparatus 10 neither enters an APSD state nor controls the VOA 25. This is because the path of the operating wavelength light is not disconnected, allowing the operation in the usual operation state.

As described above, in the optical transmission apparatus 10, an unusual connection of the OSC unit 61 is detected at a preceding stage of the DCF 28, and an unusual connection of the DCF 28 is detected at a subsequent stage of the DCF 28. Therefore, an unusual connection of the OSC unit 61 and an unusual connection of the DCF 28 can be identified.

Since an unusual connection of the OSC unit 61 and an unusual connection of the DCF 28 are identified, even if the DCF 28 has an unusual connection, the OSC light input to the OSC unit 61 is not blocked and monitoring control is possible by using the OSC light.

Since an unusual connection of the OSC unit 61 and an unusual connection of the DCF 28 are identified by using the OSC light included in the signal light, they can be identified even at the zero-wave operation state.

Since the VOA 25 is controlled, high power signal light is prevented from being output at the connection with the DCF 28, providing safety.

When the DCF 28 has a usual connection but the OSC unit 61 has an unusual connection, the optical transmission apparatus 10 does not enter an APSD state, which eliminates an unnecessary APSD operation.

Since an unusual connection of the DCF 28 is detected under the closed state of the optical amplifier unit 20 (an unusual connection of the DCF 28 is detected within one unit), information does not need to be exchanged with another unit, simplifying the control.

An optical transmission apparatus 70 according to a second embodiment will be described next in detail with reference to the accompanying drawings. In the second embodiment, the optical transmission apparatus 70 includes two PreAMPMds. An unusual connection of a DCF and an unusual connection of an OSC unit are identified, and in addition, an unusual input to a core unit is also detected.

Figure 5:
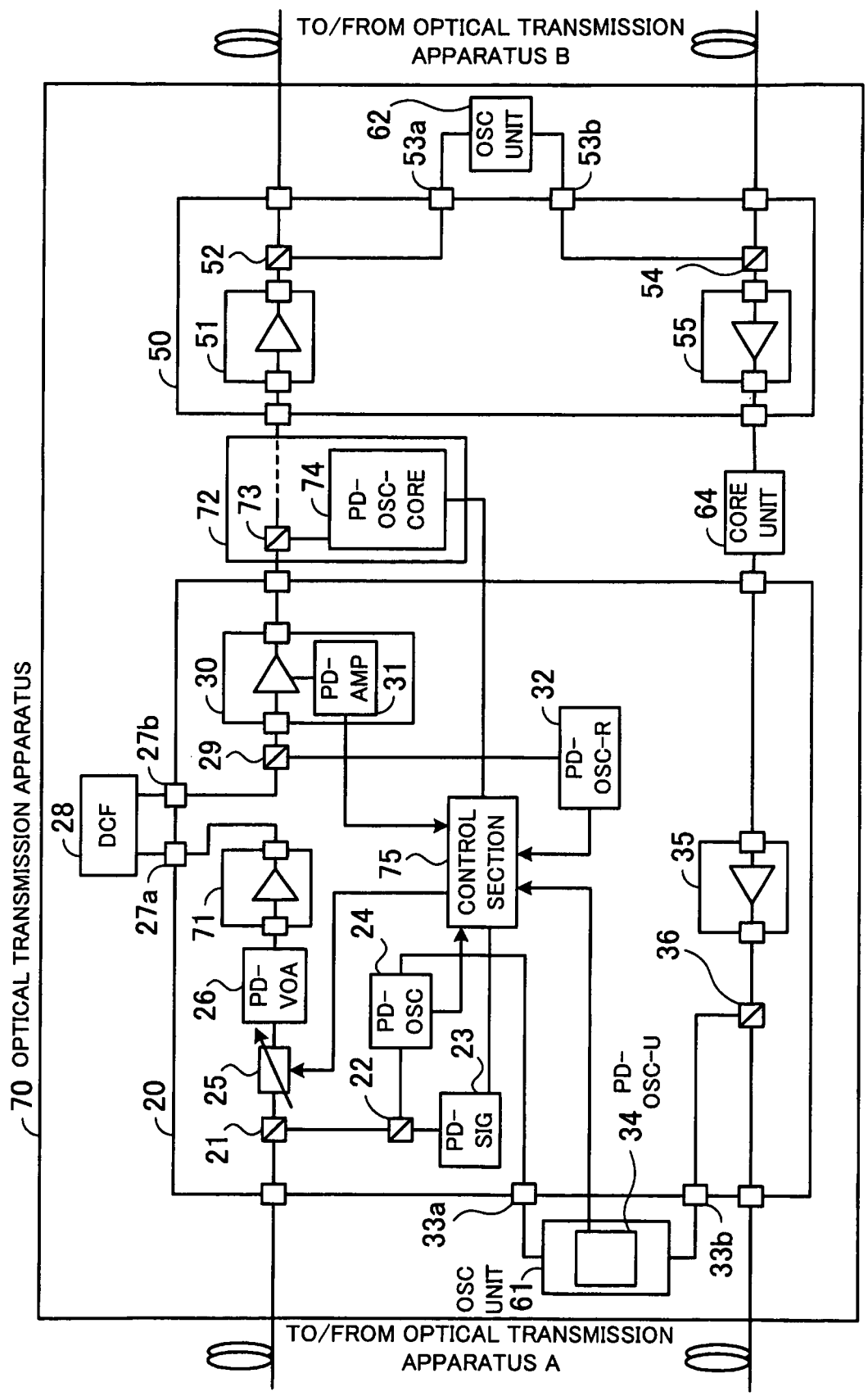
FIG. 5 is a block diagram of an optical transmission apparatus according to a second embodiment.

FIG. 5 is a block diagram of the optical transmission apparatus 70 according to the second embodiment. The optical transmission apparatus 70 illustrated in FIG. 5 differs from the optical transmission apparatus 10 illustrated in FIG. 2 in that the optical transmission apparatus 70 has a PreAMPMd 71 between a coupler 21 and a DCF 28, and a core unit 72 instead of the core unit 63. The core unit 72 includes a coupler 73 at an input stage and a PD-OSC-core 74. The PD-OSC-core 74 is, for example, a tap PD or the combination of a PD and a coupler. The same symbols as those used in FIG. 2 are assigned to the same components in FIG. 5 as those in FIG. 2 and a description thereof is omitted.

The optical transmission apparatus 70 has the PreAMPMd 71 and a PreAMPMd 30 before and after the DCF 28. It is assumed in the optical transmission apparatus 70 that OSC light having a wavelength outside the amplification bandwidth is transparent. In other words, it is assumed that the optical transmission apparatus 70 has a low loss at the wavelength of the OSC light, and the PD-OSC-core 74 of the core unit 72 disposed at a subsequent stage of the PreAMPMd 30 can detect the OSC light.

Signal light output from an optical amplifier unit 20 is input to the core unit 72. The core unit 72 has the coupler 73 at the front stage. The coupler 73 branches OSC light included in the signal light and outputs the OSC light to the PD-OSC-core 74.

The PD-OSC-core 74 detects the level of the OSC light. A control section 75 detects an unusual connection of the DCF 28, an unusual connection of an OSC unit 61, WDM-LOS, an unusual input to the core unit 72, and others according to whether the levels of light are detected by a PD-SIG 23, a PD-OSC 24, a PD-AMP 31, a PD-OSC-R 32, a PD-OSC-U 34, and the PD-OSC-core 74. When the control section 75 detects an unusual connection of the DCF 28, the control section 75 controls the VOA 25 such that the signal light is not output from the connection between the optical amplifier unit 20 and the DCF 28. When the control section 75 detects an unusual connection of the DCF 28, an unusual input to the PreAMPMd 30, and an unusual input to the core unit 72, the control section 75 performs an APSD operation.

FIG. 6 illustrates the states of the optical transmission apparatus 10. FIG. 6 illustrates whether each of the PD-SIG 23, the PD-OSC 24, the PD-AMP 31, the PD-OSC-R 32, the PD-OSC-U 34, and the PD-OSC-core 74 described with reference to FIG. 5 detects the level of light. In FIG. 6, the symbol ○ indicates that the level of light is detected by each PD and the symbol X indicates that the level of light is not detected by the PD.

As indicated by No. 1, when each of the PD-SIG 23, the PD-AMP 31, the PD-OSC-R 32 the PD-OSC-U 34, and the PD-OSC-core 74 detects the level of light, the optical transmission apparatus 70 determines that it is in a usual operation state.

As indicated by No. 2, when each of the PD-SIG 23, the PD-AMP 31, the PD-OSC-R 32, the PD-OSC-U 34, and the PD-OSC-core 74 detects no level of light, the optical transmission apparatus 70 determines that it has a WDM-LOS state.

As indicated by No. 3, when the PD-SIG 23 and the PD-OSC-U 34 detect the levels of light, but each of the PD-AMP 31, the PD-OSC-R 32, and the PD-OSC-core 74 detects no level of light, the optical transmission apparatus 70 determines that the DCF 28 is disconnected from connectors 27a and 27b. Since the PD-OSC-U 34 detects the level of light, it can be determined that the OSC unit 61 does not have an unusual connection. Because the PD-OSC-R 32 detects no level of light, it can be determined that the DCF 28 has an unusual connection.

As indicated by No. 4, when only the PD-OSC-U 34 detects no level of light, the optical transmission apparatus 70 determines that the OSC unit 61 has an unusual connection.

As indicated by No. 5, when only the PD-AMP 31 detects no level of light, the optical transmission apparatus 70 determines that WDM-LOS occurred. Because the PD-OSC-R 32 detects the level of light, it can be determined that the DCF 28 is not disconnected from the connectors. It can be determined that the PreAMPMd 30 has an unusual input.

As indicated by No. 6, when only the PD-OSC-core 74 detects no level of light, the optical transmission apparatus 70 determines that the core unit 72 has an unusual input (low signal light input).

Since the operating wavelength light is not used, that is, the zero-wave operation state occurs, in No. 7 to No. 10, the state of the optical transmission apparatus 70 is determined by whether the PD-OSC 24 detects the level of light. Since the operating wavelength light is not used, the PD-AMP 31 detects no level of light.

As indicated by No. 7, when only the PD-OSC 24 and the PD-OSC-U 34 detect the levels of light, the optical transmission apparatus 70 determines that the DCF 28 has an unusual connection. Because the PD-OSC-U 34 detects the level of light, it can be determined that the OSC unit 61 has no unusual connection. An unusual connection of the DCF 28 can be identified.

As indicated by No. 8, when the PD-OSC 24, the PD-OSC-R 32, and the PD-OSC-U 34 detect the levels of light, the optical transmission apparatus 70 determines that the core unit 72 has an unusual input.

As indicated by No. 9, when the PD-OSC 24, the PD-OSC-R 32, and the PD-OSC-core 74 detect the levels of light, the optical transmission apparatus 70 determines that the OSC unit 61 has an unusual connection. Because the PD-OSC-R 32 detects the level of light but the PD-OSC-U 34 detects no level of light, an unusual connection of the OSC unit 61 can be identified.

As indicated by No. 10, when only the PD-AMP 31 detects no level of light, the optical transmission apparatus 70 determines that neither the DCF 28 nor the OSC unit 61 has an unusual connection.

As described above, the disconnection of the OSC unit 61 from the connectors is detected at a preceding stage of the DCF 28, and the disconnection of the DCF 28 from connectors is detected at a subsequent stage of the DCF 28. Therefore, the disconnection of the OSC unit 61 from the connectors and the disconnection of the DCF 28 from the connectors can be identified. Since the PD-OSC-core 74 monitors the OSC light at the input stage of the core unit 72, whether the core unit 72 has an unusual input can be determined.

Figure 7:
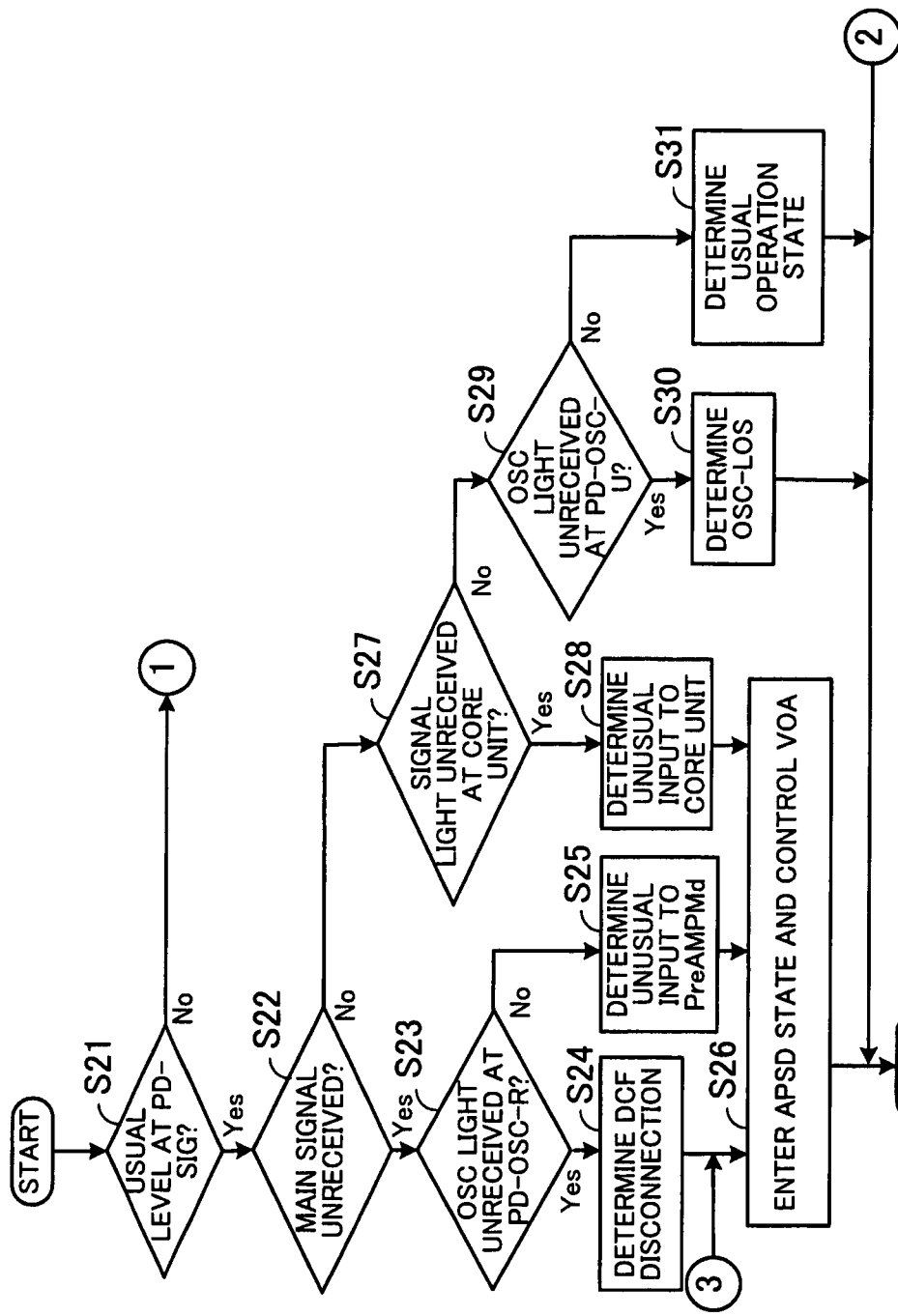
FIG. 7 is a flowchart of the operation of the optical transmission apparatus.
Figure 8:
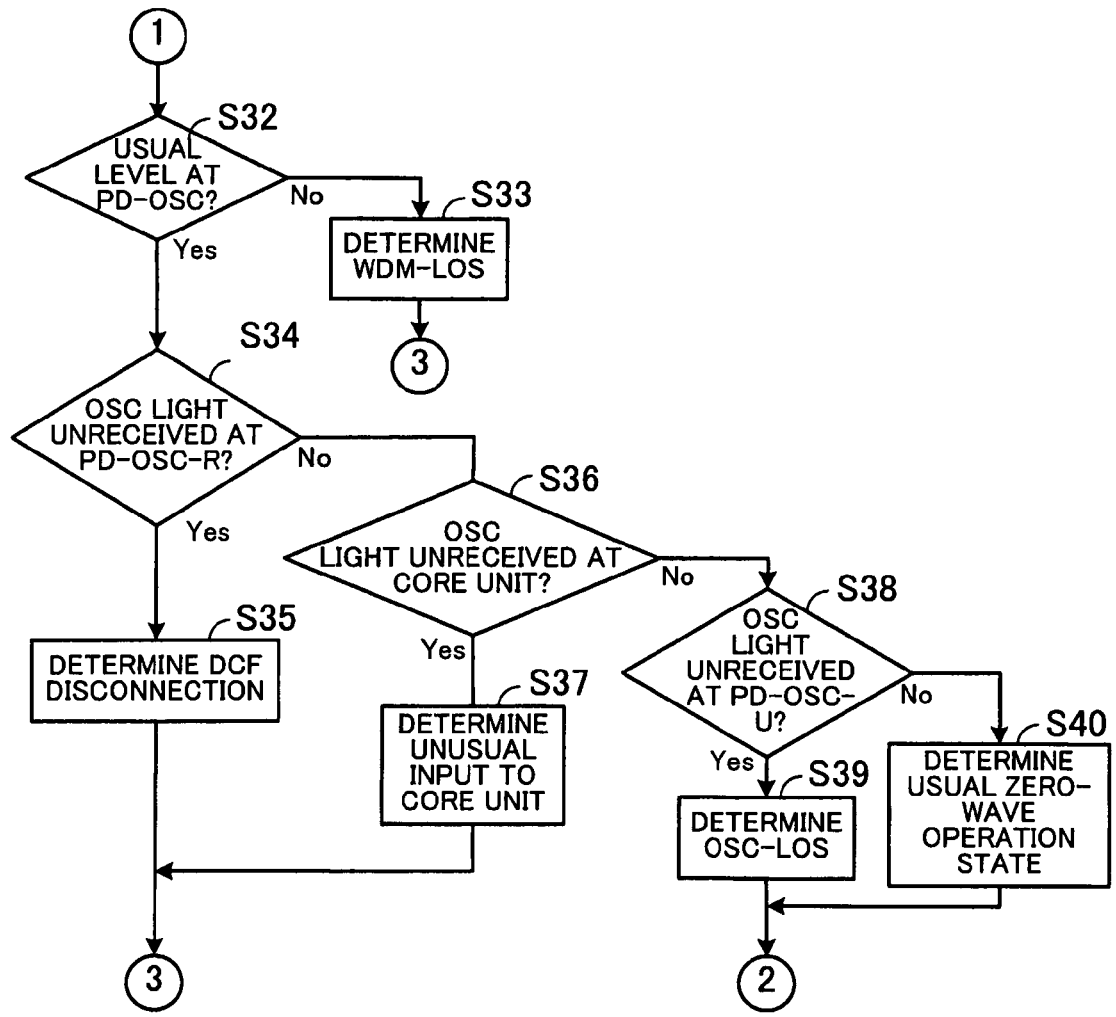
FIG. 8 is a flowchart of the operation of the optical transmission apparatus.
Figure 9:
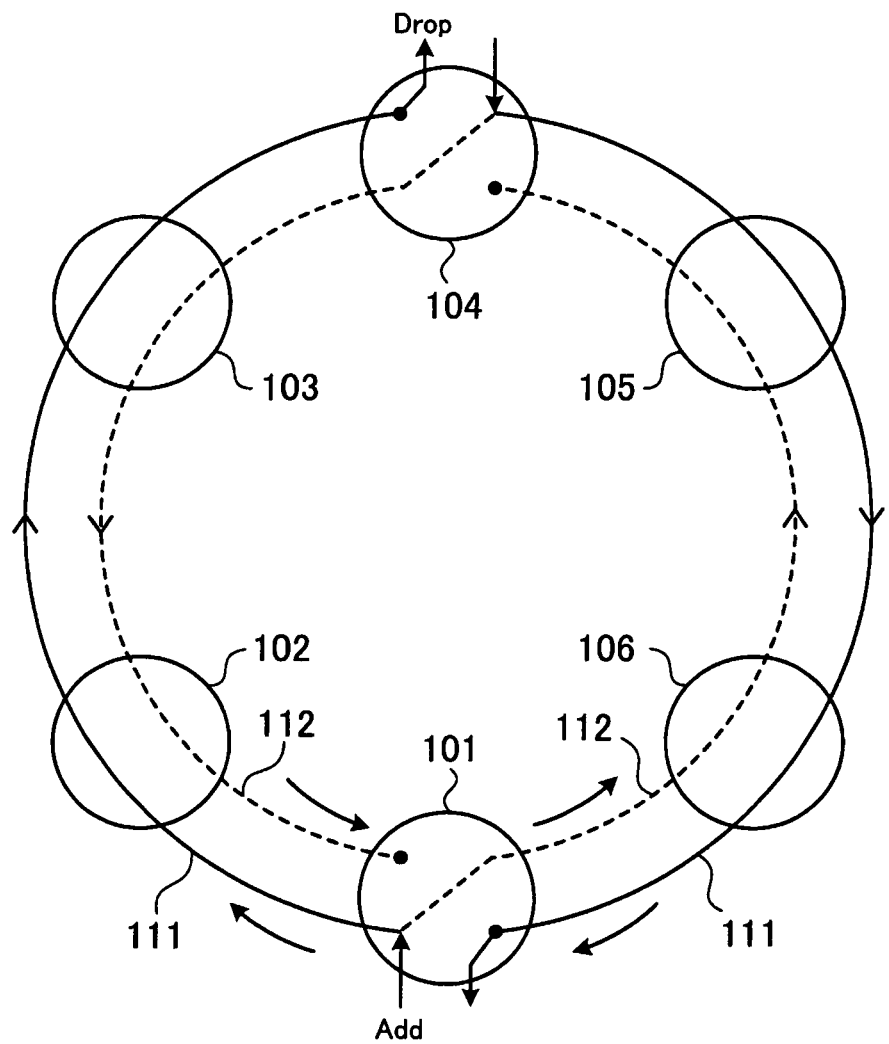
FIG. 9 illustrates an example optical ring network.
Figure 10:
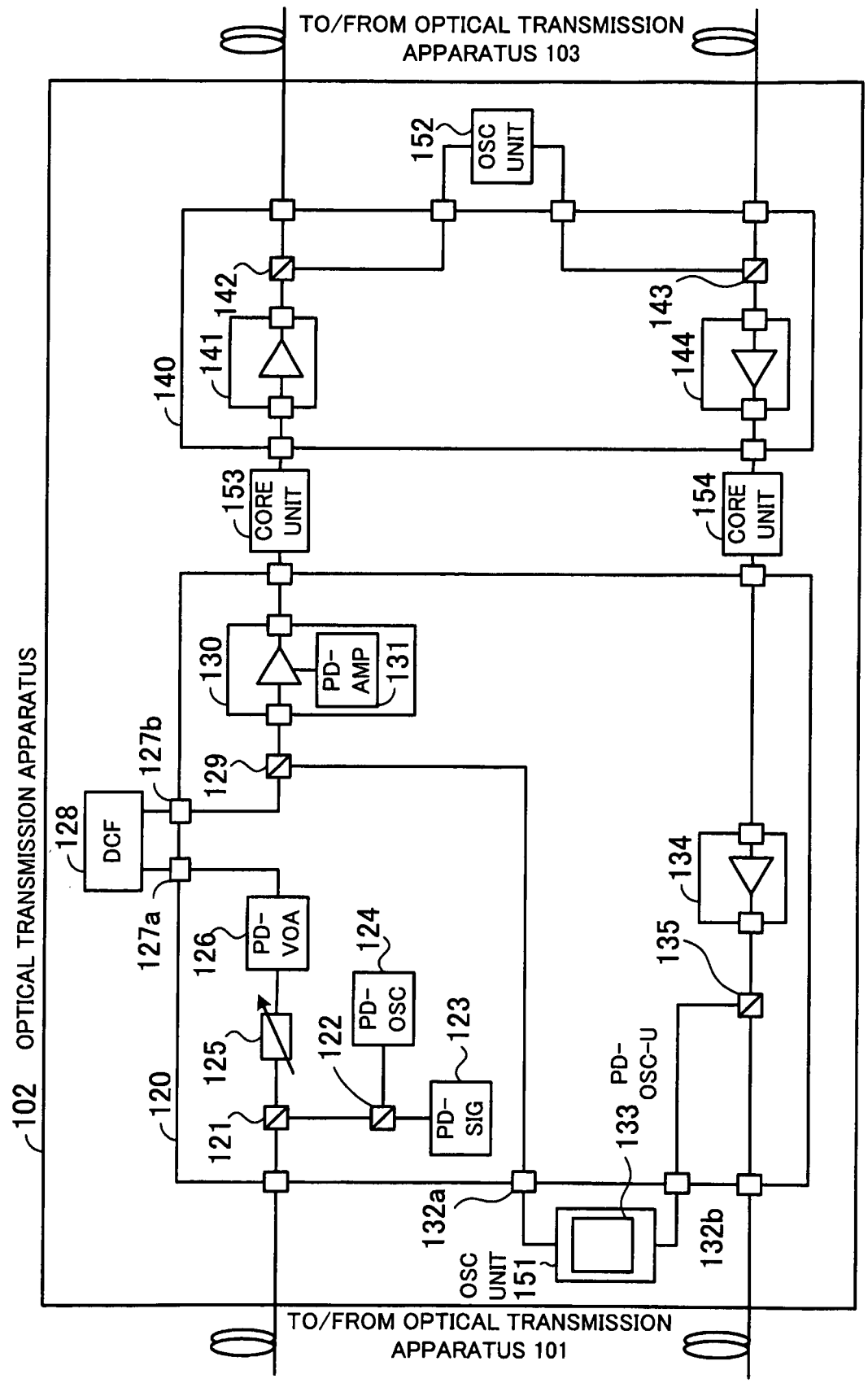
FIG. 10 is a block diagram of a conventional optical transmission apparatus.

FIGS. 7 and 8 illustrate a flowchart of the operation of the optical transmission apparatus 70.

The processes at step S21 to step S26 are the same as the processes at step S1 to step S6 described with reference to FIG. 4, and a description thereof is omitted.

Step S27: The optical transmission apparatus 70 determines whether signal light is unreceived at the input stage of the core unit 72. If the signal light is unreceived at the input stage of the core unit 72, the procedure proceeds to step S28. When the signal light is not unreceived at the input stage of the core unit 72, the procedure proceeds to step S29.

Step S28: The optical transmission apparatus 70 determines an unusual input to the core unit 72. The procedure proceeds to step S26, and the optical transmission apparatus 70 performs an APSD operation and controls a VOA 25.

Step S29: The optical transmission apparatus 70 determines whether OSC light is unreceived at the PD-OSC-U 34. In other words, the optical transmission apparatus 70 determines whether the OSC unit 61 has an unusual connection. If the OSC light is unreceived, the procedure proceeds to step S30. When the OSC light is not unreceived, the procedure proceeds to step S31.

Step S30: The optical transmission apparatus 70 determines an OSC-LOS state.

Step S31: The optical transmission apparatus 70 determines that it is in the usual operation state.

The processes of step S32 to step S35 are the same as the processes of step S10 to step S13 described with reference to FIG. 4, and a description thereof is omitted.

Step S36: The optical transmission apparatus 70 determines according to the level of light detected by the PD-OSC-core 74 whether OSC light is unreceived at the input stage of the core unit 72. If the OSC light is unreceived at the input stage of the core unit 72, the procedure proceeds to step S37. When the OSC light is not unreceived at the input stage of the core unit 72, the procedure proceeds to step S38.

Step S37: The optical transmission apparatus 70 determines an unusual input to the core unit 72. The procedure proceeds to step S26, and the optical transmission apparatus 70 performs an APSD operation and controls the VOA 25.

Step S38: The optical transmission apparatus 70 determines whether OSC light is unreceived at the PD-OSC-U 34. In other words, the optical transmission apparatus 70 determines whether the OSC unit 61 has an unusual connection. If the OSC light is unreceived, the procedure proceeds to step S39. When the OSC light is unreceived, the procedure proceeds to step S40.

Step S39: The optical transmission apparatus 70 determines an OSC-LOS state.

Step S40: The optical transmission apparatus 70 determines that it is in the usual zero-wave operation state.

As described above, even when two PreAMPMds are provided, the PreAMPMd 71 disposed between the coupler 21 and the DCF 28 and the PreAMPMd 30 disposed at a subsequent stage of the DCF 28, an unusual connection with the DCF 28 and an unusual connection with the OSC unit 61 can be identified.

Since the optical transmission apparatus 70 monitors the OSC light at the input stage of the core unit 72, an unusual connection with the DCF 28 and an unusual connection with the OSC unit 61 can be identified, and in addition, an unusual input to the core unit 72 can be determined. Even when one PreAMPMd, the PreAMPMd 30, is used as illustrated in the first embodiment, if the core unit 63 is made to have the same structure as the core unit 72, an unusual input to the core unit 63 can be determined.

In an optical transmission apparatus, signal light is output to the first component at a preceding stage of the second component; the first detection section determines whether the first component receives the signal light or not; and the second detection section detects the signal light at a subsequent stage of the second component.

Therefore, the first detection section can detect an unusual connection of the first component, and the second detection section can detect an unusual connection of the second component, allowing an unusual connection with the first component and an unusual connection with the second component to be identified.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention have been described in detail, it should be understood that various changes, substitutions, and alterations could be made hereto without departing from the spirit and scope of the invention.

What is claimed is:

1. An optical transmission apparatus for transmitting wavelength division multiplexed signal light, the optical transmission apparatus comprising a unit including:
   a first branching section which branches the signal light into first signal light and second signal light;
   a first detection section which detects operating wavelength light included in the first signal light;
   a second detection section which detects an optical supervisory channel signal included in the first signal light;
   a first connection section connected to a first component including a third detection section that receives the first signal light and detects the optical supervisory channel signal included in the first signal light;
   a second connection section connected to a second component that receives the second signal light;

a second branching section which is disposed at a subsequent stage of the second connection section and which branches the second signal light output from the second component into third signal light and fourth signal light;

a fourth detection section which detects an optical supervisory channel signal included in the third signal light;

a fifth detection section which is disposed at a preceding stage of an amplifier unit that amplifies the fourth signal light and which detects operating wavelength light included in the fourth signal light; and a control unit which monitors a state of the optical transmission apparatus on a basis of detection results obtained by the first detection section, the second detection section, the third detection section, the fourth detection section, and the fifth detection section.

2. The optical transmission apparatus according to claim 1, wherein the control unit monitors loss of the operating wavelength light, loss of the optical supervisory channel signal, loss of the operating wavelength light in the second component, a connection state of the first component, and a connection state of the second component on a basis of the detection results obtained by the first detection section, the second detection section, the third detection section, the fourth detection section, and the fifth detection section.

* * * * *